Patented Jan. 20, 1931

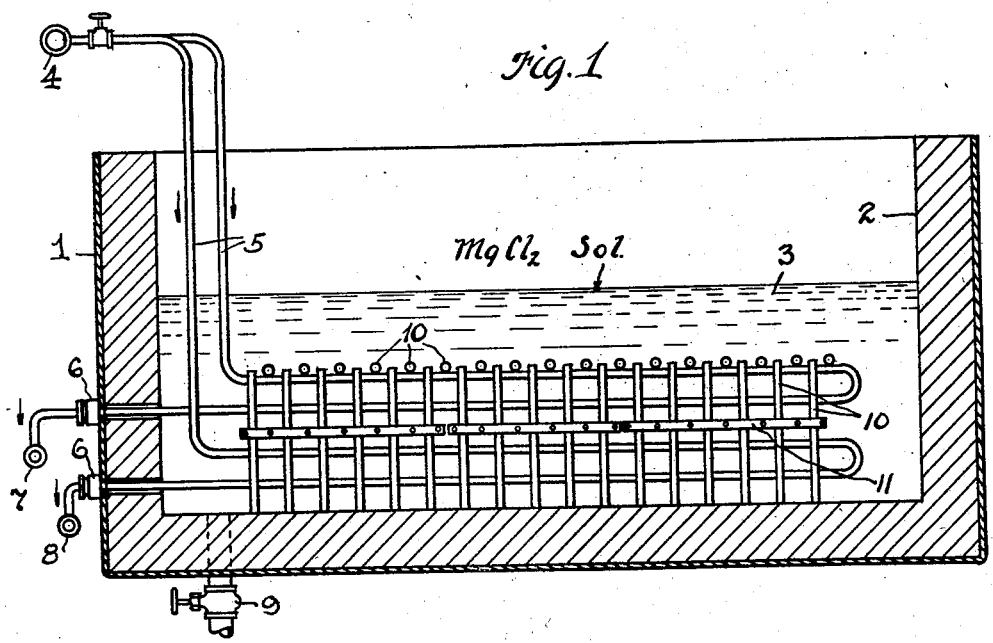
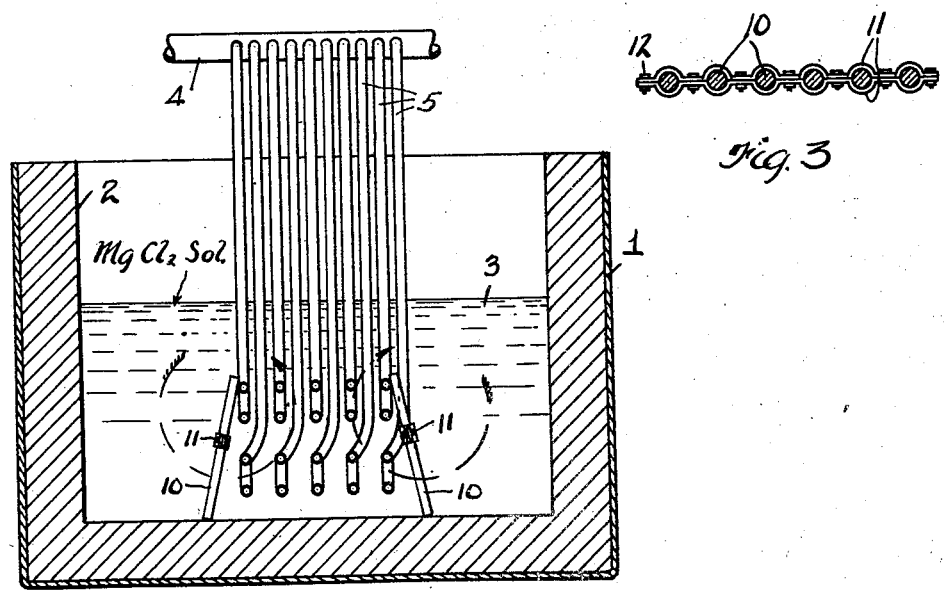

1,789,385

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

METHOD OF CONCENTRATING SOLUTIONS OF MAGNESIUM CHLORIDE

Application filed March 20, 1929. Serial No. 348,430.

The present invention relates, as indicated, to methods and means for concentrating solutions of magnesium chloride, and specifically to concentrating such solutions to a strength in excess of that corresponding to the normal hydrate composition, $MgCl_2.6H_2O$, without incurring appreciable contamination of the concentrated solution with heavy metals taken up in the concentration procedure.

In the preparation of anhydrous magnesium chloride or of the lower hydrated forms thereof from solutions, it is desirable to remove as much water as economically feasible in the convenient manner afforded by evaporation by atmospheric boiling. If steam be available at a pressure approximating 350 pounds gauge, such concentration may be carried readily to a point where the concentrated solution will approximate the composition of the tetrahydrate form, the boiling point of such a solution (i. e. the tetrahydrate) being 193° C. The temperature of such steam being approximately 224° C., an adequate heat head remains at the end of the concentration which insures active boiling up to the finishing point.

For the purpose of dehydration in the solid phase, a granular, flaked or otherwise divided form of hydrated chloride is desirable as raw material for drying as in a heated aeroform current. For such use the hexahydrate form is least suited, since its melting point is low and delicate control of temperature is necessary to avoid a sticky condition developing which would interfere with the drying process. The tetrahydrate form is far better suited for use as the initial feed in an air drying method, although I have found that it is not necessary to carry the preconcentration that far in order to prepare a solid form of the salt well adapted for further drying. I have found that a very satisfactory form of hydrated chloride is afforded by the flaked form having a water content equivalent to $4.4H_2O$ crystal water. Such a salt has a boiling point when fused to a 54.4 per cent $MgCl_2$ solution of 190° C., a temperature easily reached with 350 pounds gauge pressure steam.

Although concentration, as indicated, to the tetrahydrate composition or to a somewhat more highly hydyrated form of the salt may be readily accomplished by boiling using steam of suitable temperature and pressure, difficulties of a practical nature arise, to wit:—iron, copper or aluminum heating surfaces corrode rapidly under such conditions and the solutions become charged with heavy metals. The cost of heating surface renewals becomes excessive and the product unfit for certain important uses, such as for the preparation of magnesium metal in which the presence of heavy metals is for most purposes prohibited or undesirable.

The economies otherwise incident to carrying concentration by boiling to a composition approximating the tetrahydrate are attractive and I have invented a simple method and means for overcoming almost completely the difficulties cited.

To the accomplishment of the foregoing and related ends, the invention, then, consists of the steps and means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:—

Fig. 1 illustrates in part vertical longitudinal cross-section a boiling or concentrating kettle Fig. 2 a transverse section thereof and Fig. 3 a detail of the rack of protective metal bars used in my method. Said drawing represents a preferred form of apparatus for carrying out my method.

In said drawing, 1 represents a steel kettle or pan in which a lining 2 of suitable nature, such as brick or the like, unreactive with magnesium chloride solution is applied. The kettle is adapted to hold a boiling solution 3 of magnesium chloride. 4 is a pipe supplying high pressure steam, preferably 350 pounds gauge pressure or more, to which are connected a series of heating coils 5 of hairpin shape discharging through stuffing boxes 6 in the end of the pan into the condensate headers 7 and 8 adapted to receive the condensate and deliver it to suitable traps for later forwarding as desired. A plurality of such coils is preferably employed arranged in the form indicated in the drawing in which two superimposed rows of five hairpin coils each are shown each connected separately to the supply pipe and to the condensate headers respectively. These heating coils may be supported by racks or other means not shown as is well understood by those versed in the art. A solution draw-off 9 is provided for emptying the kettle.

The coils above described are made of substantially pure nickel tubing and in order to protect them from corrosion and the solution from contamination with metallic nickel, I provide a mass or body of aluminum in the form of bars 10, preferably distributed somewhat uniformly throughout the solution and in contact with the nickel coils. I preferably use round aluminum bars 10 held together by nickel straps 11 secured by bolts 12 as shown. These are assembled into racks containing a number of aluminum bars each and are either laid upon the coils or are so placed as to lean or rest against same. Various ways of arranging the bars, or racks of bars and their relation to the nickel coils is permissible, the precise arrangement shown having been found convenient. It will be seen that even if some of the coils in the magnesium chloride solution are not directly in contact with an aluminum bar, yet all of the coils are interconnected through the steam header and the condensate headers and I have found that it is not necessary that each and every coil be connected with an aluminum bar.

It will be seen that the arrangement illustrated places the aluminum not only in contact with the nickel coils or heating surface but with the solution and at a location therein where the circulation of the solution will cause it to flow over, around and among the aluminum bars as indicated by the arrows in Fig. 2.

In the operation of my method and apparatus any available solution for example one preferably approximating the hexahydrate composition is charged into the kettle. Steam is turned on and active boiling is pushed for the purpose of completing the concentration preferably in the shortest feasible time, involving the shortest time of exposure of the coils and solution to contact. When the solution has reached the desired concentration as may be readily ascertained from its boiling point, it is promptly drawn off from the kettle and removed from further contact with contaminating metals. It may be run to a storage kettle, suitably lined with a protective lining or directly into drums or to other means for solidification such as a flaker for the production of the desired form of solid hydrated chloride. I prefer, however, to flake the concentrated solution by congealing it upon a cooled revolving metal drum from which the solidified chloride is removed by a scraper or knife in the form of flakes, admirably suited for many uses, especially for air drying or treatment with hydrochloric acid for the preparation of the anhydrous salt.

As an example I charge into the kettle a solution of magnesium chloride testing 40 per cent. $MgCl_2$ which I then concentrate by boiling using 350 pound gauge steam to a boiling point of 190° C., the solution then containing 54.4 per cent. $MgCl_2$ corresponding to the composition $MgCl_2.4.4H_2O$. I find that this concentrated product when so treated in the kettle herein described in which the nickel coils are protected by masses of aluminum metal will contain less than .002 per cent. nickel and no copper and that the magnesium metal produced from such chloride will contain less than .02 per cent. nickel and no copper. I find further that if nickel coils alone are used, the nickel content of the concentrated solution may be as high as 5 to 10 times as great, involving greatly decreased coil life and a markedly poorer grade of metallic magnesium when the chloride is used for the production of that metal.

I have found it helpful to sand blast the aluminum bars after each batch is run for the purpose of cleaning same and removing therefrom what appears to be a scale of metallic nickel, thus preventing among other things such scale falling off and later going into solution or suspension in the hot concentrated chloride of the next batch. I have found that by the proper proportioning of coil surface to the duty involving the concentration from 40 per cent solution to 54.4 per cent may be done in about four hours boiling time and that a longer boiling time will result in the addition of more heavy metal to the solution. I have found that by using only 225 pounds steam pressure a higher nickel content of solution is obtained. After the solution has reached the desired concentration, it is immediately withdrawn and flaked.

The same method of procedure is also valuable when concentrating magnesium chloride solutions to any strengths desired, since the coil corrosion is greatly reduced and the contamination with metals is almost entirely avoided.

Previous efforts employing iron or copper or aluminum coils, either in iron or protectively lined kettles have shown unsuccessful results in that high concentrations could not be reached without excessive coil metal loss and excessive contamination of the solution with heavy metals. I have found that zinc bars may be used instead of aluminum, but that aluminum is preferable. I prefer to use aluminum at least in all cases where the presence of aluminum in the final product, whether chloride or metallic magnesium, is less undesirable than would be the presence of zinc therein.

It is obvious that such concentration can be carried out in a nickel kettle without lining, either using nickel heating coils or a steam jacket, but the method disclosed will require the least investment in nickel and the least upkeep, constituting a very convenient and practicable means of carrying out my method.

As indicated above the distribution of the protective metal throughout the solution and in contact with the nickel may be attained in a variety of ways, the one illustrated constituting a simple and effective method. Another simple method would be to hang a number of hairpin shaped ingots or bars of the protective aluminum metal on each one of the coils distributed along the horizontal runs to give distributed protection throughout the coil length.

Other modes of applying the principle of my invention may be employed instead of the one explained, change being made as regards the means and the steps herein disclosed, provided those stated by the claim or their equivalent be employed.

I therefore particularly point out and distinctly claim as my invention:—

In a method of concentrating a solution of magnesium chloride, the step which consists in evaporating said solution by heating same through a nickel heating surface while maintaining said solution and said nickel in contact with a body of metallic aluminum.

Signed by me this 14 day of March, 1929.

SHELDON B. HEATH.